Jan. 14, 1947.　　W. H. COLBERT ET AL　　2,414,406
COATING APPARATUS
Filed April 19, 1944　　2 Sheets-Sheet 1

INVENTORS
William H. Colbert.
Arthur R. Weinrich.
BY Corbett, Mahoney + Miller
ATTORNEYS Jan. 14, 1947.  W. H. COLBERT ET AL  2,414,406
COATING APPARATUS
Filed April 19, 1944   2 Sheets-Sheet 2

INVENTORS
William H. Colbert.
Arthur R. Weinrich.
BY Corbett, Mahoney & Miller
ATTORNEYS

UNITED STATES PATENT OFFICE 2,414,406

COATING APPARATUS

William H. Colbert and Arthur R. Weinrich, Brackenridge, Pa., assignors to Libbey-Owens-Ford Glass Company, Toledo, Ohio, a corporation of Ohio Application April 19, 1944, Serial No. 531,690

4 Claims. (Cl. 91—12.2)

The present invention relates to a coating apparatus. It has to do particularly with an apparatus for carrying out the method of coating by deposition resulting from thermal evaporation of a material or of different materials in the presence of a vacuum, of different surfaces of an article, such as a prism, sheets, lens, bowls, which are successively presented at predetermined times to an evaporating source. More particularly, it has to do with means and a method for producing coating deposits successively upon different surfaces of an article in the presence of a vacuum without breaking the vacuum during the application of the successive deposits to the surfaces of the article.

In coating articles such, for example, as prisms, lens, sheets, etc., it is highly desirable at times to coat one surface of such articles with one material and the other surfaces thereof with a different material. Heretofore, this has been accomplished by deposition resulting from the thermal evaporation of the materials in the presence of a vacuum by positioning one face or surface of the prism toward the evaporating source and evaporating one material from that source, removing the bell or housing of the apparatus which obviously broke the vacuum within the chamber, and then turning the prism to present another face or surface thereof to the evaporating source. Before this second face could be coated it was necessary to again create a vacuum within the chamber and then evaporate a different material onto said second face. This same operation had to be repeated in order to apply the desired surface coating to the third or final surface or face of the prism. These various steps were time-consuming and thus materially increased the cost of production of coated prisms, since the glass must be recleaned between each operation and handling caused rejections.

One of the objects of the present invention is to provide an improved apparatus for producing coated articles, permitting coating on two or more sides, which have none of the disadvantages of the prior art methods and apparatus.

Another object of the invention is to provide improved means for producing surface coated prisms and other articles wherein different materials are employed for coating different sides or faces of the prisms, etc., and wherein the operation of coating is carried out intermittently and successively within a vacuum without breaking the vacuum during the coating operation or series of successive coating operations.

A further object of our invention is to provide an improved apparatus for coating a multisurface article, such as a prism, in a vacuum chamber in which there is located a brushless type prime mover, such as an induction type motor or a solenoid type electric motor, whose operation is controlled to cause the prism to be coated to be successively rotated or revolved a predetermined amount between the successive coating applications of a material or different materials to the different and successive faces or surfaces of the prism, etc.

Another object of our invention is to provide an improved apparatus for applying a coating or coatings of a material or materials to the different faces or surfaces of an article, such as a prism, by intermittently turning or rotating an article or prism support a predetermined amount at predetermined times by a prime mover, in which the article, its support and the prime mover are located within a vacuum chamber, and in which a continuous vacuum is maintained within the chamber during the entire coating operation or operations.

A further object of our invention is to provide an apparatus of the foregoing character having a movable support for an article such as a prism, in which the support is provided with spaced upright means which engage upright edges of the prism in such a manner as to conceal only a minute portion of the surfaces or faces of the prism.

As a further object of the invention, means are provided for the continuous rotation of an article, particularly a shaped article such as a bowl, idol, or figure during the application of a coating by thermal evaporation to all surfaces thereof.

Generally speaking, our present invention relates to an apparatus for producing articles, such as prisms, plates, lens, etc., made of various materials whose different faces or surfaces have coatings of a material or different materials applied thereto by deposition resulting from the thermal evaporation of the material or materials within a vacuumized chamber, in which the articles are intermittently turned or rotated between the operations of coating different faces or surfaces thereof by means of a prime mover, such as an induction type motor or solenoid type motor, which is located within the vacuumized chamber and whose operation is controlled to effect the periodic turning or rotation of a prism or other article a predetermined angular amount so as to present successively the different faces or surfaces of the prism to an evaporating source consisting of one or more evaporating units located within the chamber, whereby it is possible to successively coat each of the surfaces similarly or to provide one face or surface of the prism with a coating of one material, such as silver, and the other sides or faces of the prism with a coating or coatings of different materials such, for example, as magnesium fluoride.

In accordance with our invention, the apparatus employed to carry out our process is preferably provided with a brushless type prime mover, such as an open type electric motor which can be easily evacuated of air when the chamber in which it is located is evacuated of air and which, because of its open or skeleton-housing type, lends itself well to the creation of a high vacuum within the chamber. Moreover, the apparatus embodying the invention includes a novel rotatable or turnable support for a work-piece, such as a prism, which is periodically turned or rotated by the prime mover and a plurality, three being shown, of thermal evaporating units which are preferably energized and heated electrically, for use in evaporating different materials, such as different metals or other inorganic compounds, or the same material, such as one particular metal or material, to produce intermittently and successively surface coatings by deposition upon the different surfaces or faces of the prism or plate or other article as the prism support is turned to present a face or surface of the prism to the evaporating units.

If desired, the article or workpiece, or a plurality of such, may have imparted to them through their supports or platforms, continuous rotative movement during the deposition thereupon of the material resulting from thermal evaporation within the vacuum chamber.

The above and other objects and advantages of our invention will appear from the following description and appended claims when considered in connection with the accompanying drawings forming a part of this specification wherein like reference characters designate corresponding parts in the several views.

Before explaining in detail the present invention, it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention herein claimed beyond the requirements of the prior art.

Figure 1:
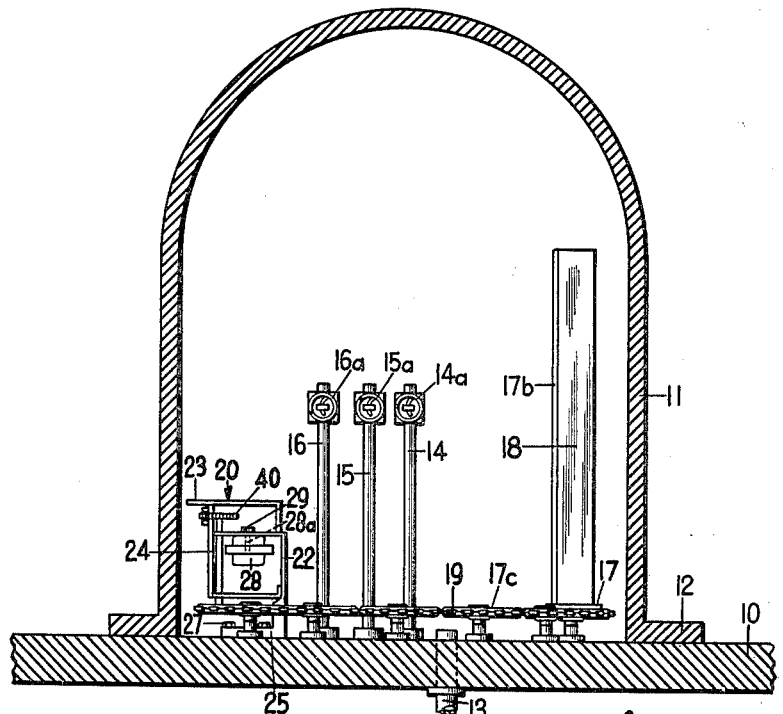
Fig. 1 is a vertical sectional view of an apparatus embodying the present invention.
Figures 2, 3:
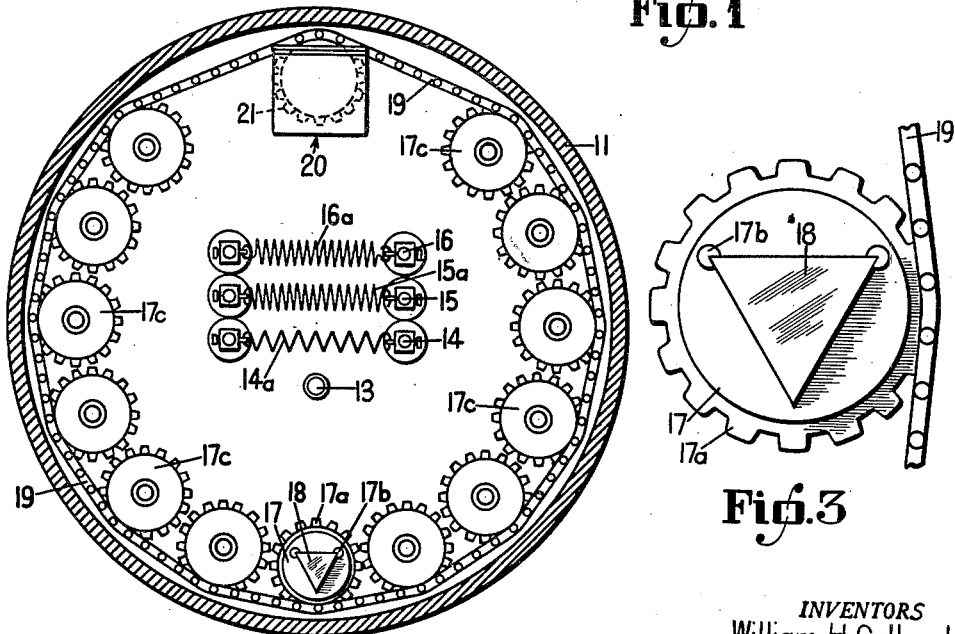
Fig. 2 is a horizontal sectional view of the apparatus of Fig. 1.
Fig. 3 is an enlarged top plan view of a rotatable or turnable article or workpiece support embodying our invention.

Referring now particularly to the drawings and especially Figs. 1, 2 and 3 thereof, there is shown one form of apparatus suitable for performing the present invention. In Fig. 1 the apparatus is shown as comprising a supporting base 10 having mounted thereupon a housing or bell-like casing 11 whose side walls at the lower ends thereof are provided with a surrounding flange or projection 12. The housing 11 when placed upon the base 10 provides an evaporating chamber capable of being vacuumized. To evacuate air from within the chamber there is provided an outlet pipe or conduit 13 which is in communication with the chamber and which is also connected to vacuum pumps (not shown).

Located within the chamber and preferably mounted upon the base 10 is a series or plurality of thermal evaporating units, each unit being separate and independent of the other units. The unit 14 comprises a pair of upright supporting posts between which a tungsten filament or electrical heating coil 14a is supported. The unit 15 likewise comprises a pair of upright supporting posts and a substantially horizontally disposed tungsten filament or coil 15a which is supported by the posts. The thermal evaporating unit 16 also comprises a pair of upright supporting posts which serve to support, in substantially horizontal position, a tungsten filament or heating coil 16a.

A rotatable article or workpiece support is located within the chamber adjacent a wall thereof and, as shown, is in the form of a circular or disk-like member 17 in the form of a sprocket having peripheral teeth 17a formed thereon. Projecting upwardly from the supporting member 17 and located in spaced relation, is a pair of article or workpiece-engaging posts or members 17b. Each of these members is provided with a substantially V-shaped longitudinally extending notch to receive and frictionally engage the upright edges of an article or workpiece, such as a prism 18. Since the surfaces or faces of the prism are to be provided with a coating or coatings of a suitable material or materials evaporated within the chamber, it is desirable to minimize the unexposed surfaces or portions of the prism faces. It will be noted that the supporting members 17b cover only relatively small portions of the faces or surfaces of the prism 18.

The article support 17 and its supported article are adapted to be turned or rotated at predetermined times to present opposite faces or surfaces of the prism 18 to the thermal evaporating units 14, 15 and 16. To accomplish this turning or rotating of the prism support, we have provided within the chamber a prime mover, shown as a whole at 20, which includes a brushless type electric motor of the induction or solenoid type.

The prime mover 20 is provided with a driving sprocket or gear 21 which meshes with a sprocket chain 19 which chain also meshes with the teeth or projections 17a of the article support 17 so that when the sprocket 21 of the prime mover is driven, the article support 17 will be turned or rotated through the medium of the sprocket chain 19.

As seen particularly well in Fig. 2 of the drawings, the driving mechanism for the article support 17 also comprises a series or plurality of sprockets 17c which are suitably rotatably mounted upon the base 10 in a circular or elliptical manner. Each of the sprockets 17c is provided with peripheral teeth which are at all times in mesh with the sprocket chain 19. While we have shown only a single rotatable article support 17 for an article, such as the prism 18, it will be understood that, if desired, each of the sprockets 17c, or any number of them, may be employed as article or prism supports, it being only necessary to provide a sprocket 17c with a pair of upright article-engaging and supporting posts or members similar to those shown at 17b in Fig. 3.

Figure 4:
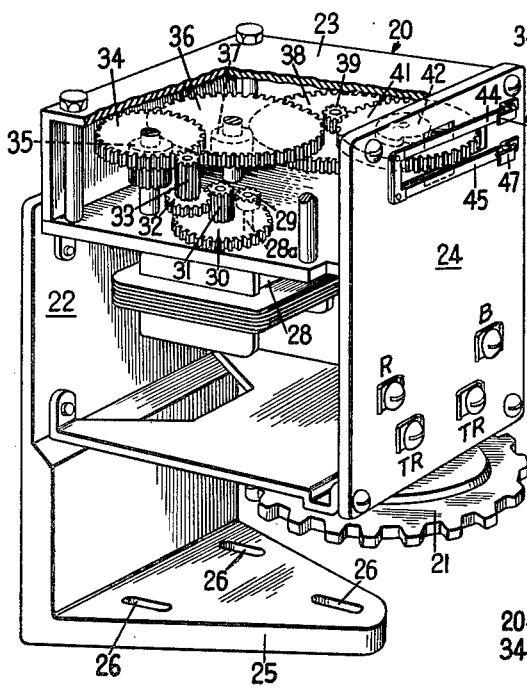
Fig. 4 is a perspective view, partly broken away, of a brushless type prime mover comprising a portion of the apparatus of our invention.
Figure 5:
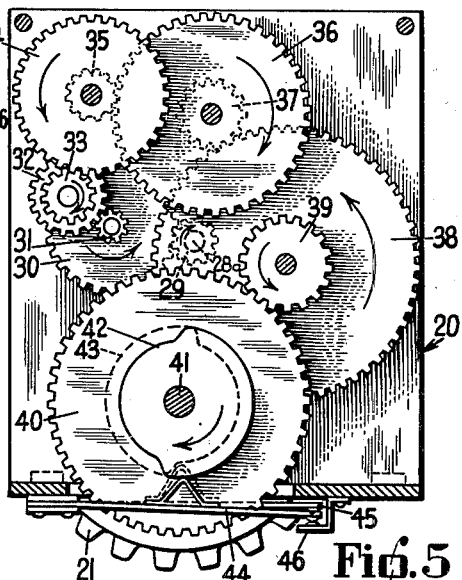
Fig. 5 is a top plan view of the prime mover of Fig. 4 with the top plate member removed to reveal the arrangement of the driving gear train for rotating the workpiece support.
Figure 6:
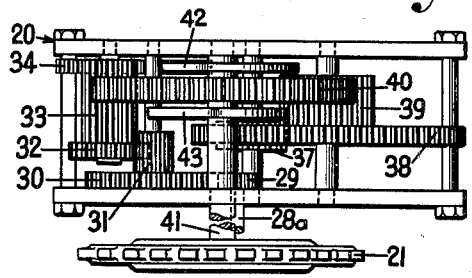
Fig. 6 is a side elevational view of the gearing shown in Figs. 4 and 5.

The prime mover constituting a part of the present invention is shown in detail in Figs. 4, 5 and 6 of the drawings. As therein shown, the prime mover 20 includes a brushless type electric motor. It comprises a substantially skeleton-like or open housing having a front or inner wall 22, a top plate or cover 23 and an outer or back plate or wall 24. The front or inner wall 22, as shown, is extended downwardly and turned outwardly to provide a supporting base or foot portion 25. The foot portion 25 is provided with a series of slots 26 to receive bolts or screws 27 (Fig. 1) to securely mount the prime mover 20 on the supporting base 10 of the apparatus.

It is to be noted that the opposite sides of the housing are open, see particularly Figs. 1 and 4, so as to provide for the prime mover an open-type housing or casing to permit air to be evacuated readily from within the housing and to thus readily and rapidly permit the creation of a vacuum within the casing comparable to that which may be created within the chamber of the apparatus. Ordinary motor construction continues to leak volumes of air into the chamber as it is evacuated over long periods of time and interferes in the securing of good vacuum.

The prime mover 20 includes a reduction gear train for the purpose of driving the sprocket 19 and prism support 17 at relatively slow speeds at predetermined times and thus serves to convert the high speed of the electric motor 28 into a relatively low driving speed for rotating the article to be coated and its support slowly. As lubrication of the various bearings would lead to evaporation of such oils in the vacuum and spoiling of the same we find slow moving non-lubricated drives necessary.

The electric motor 28 is provided with a drive shaft 28a carrying a pinion 29 which meshes with a gear 30. The gear 30 carries a pinion 31 which is in mesh with a gear 32 and a pinion 33 carried by the last-named gear meshes with a gear 34. The gear 34 carries a pinion 35 in mesh with and serving to drive a gear 36. The gear 36 is provided with a pinion 37 in mesh with a gear 38. The gear 38 carries a pinion 39 which meshes with and serves to drive a gear 40 carrying a driven shaft 41 upon which the driving sprocket 21, previously described, is mounted. Thus, the drive to the sprocket chain 19 is from the motor shaft 28a through the train of gearing and the driven shaft 41 and its attached sprocket 21.

The driven shaft 41 carries a pair of cams, the upper cam being shown at 42 and the lower cam at 43. The outer upright wall 24 of the prime mover housing carries a pair of movable contacts 44 and 45 and a pair of fixed contacts 46 and 47. The movable contact 44 is adapted to be engaged and actuated by the upper cam 42 and the movable contact 45 by the lower cam 43. These parts are all clearly shown in Fig. 7, the contacts and cams being shown diagrammatically along with the wiring diagram.

The electric motor 28 which includes the motor field coil MFC and the circuit as shown, are designed so that by closing the circuit, as by throwing a switch W, the driven shaft 41 rotates through 180 degrees and then stops and does not move again until caused to do so by the throwing of the switch W in the opposite direction, whereupon the motor again moves in the same direction through 180 degrees. This intermittent rotation of the motor for one-half a revolution periodically can be repeated indefintely by actuating the switch W. Obviously angular rotation to various other amounts in steps can similarly be secured.

Figure 7:
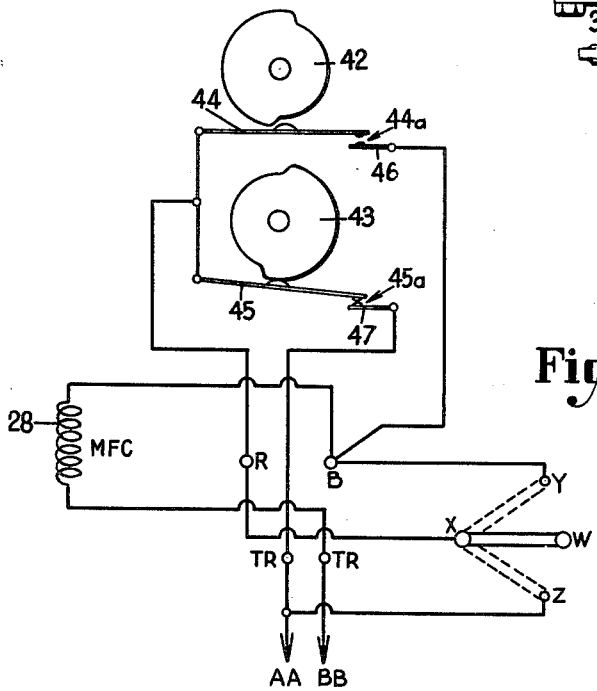
Fig. 7 is a view showing a suitable wiring diagram and switch means which are associated with the prime mover of Figs. 4, 5 and 6.

In the wiring diagram the two lines from the secondary side of the transformer are designated as AA and BB and there is shown the switch W of the single pole double throw type which operates between X and Y and between X and Z, as shown in broken lines in Fig. 7. The contact points between contact 44 and contact 46 are designated at 44a and those between contacts 45 and 47, at 45a. When the motor 28 is stopped, either contact 44a or contact 45a is open and the other contact closed. The movable contact members or arms 44 and 45 are actuated by the cams 42 and 43, respectively, as stated above. The cam 42 is notched at one point in its periphery to open contact 44a once in 360 degrees long enough to open the circuit passing through it. Likewise, cam 43 opens contact 45a once in 360 degrees to open its circuit. The notches in the two cams are positioned 180 degrees apart with respect to each other in order to open one circuit every one-half revolution of the driven shaft 41.

The operation of the prime mover and circuit are substantially as follows: Assuming the motor 28 is in the stopped position with contact 44a open, by throwing the switch W to close the circuit between X and Y, the circuit can be traced from BB to TR through motor field coil MFC to B to Y to X to R through closed contact 45a to TR to AA. This is a closed circuit and the motor is in operation. Shortly after starting, contact 44a closes and stays closed. One-half revolution, after starting contact 45a opens by becoming engaged in the notch of cam 43 and the motor stops. Contact 45a is now open but contact 44a is closed. By throwing the switch W to close the circuit between X and Z, the circuit can be traced from BB to TR through motor field coil MFC to B through closed contact 44a to R to X to Z to AA. This is a closed circuit and the motor is running. Shortly after starting, contact 45a closes and remains closed. One-half revolution after starting, contact 44a opens by becoming engaged in the notch of its corresponding cam 42 and the motor stops. Now the parts are back in the original positions and the circuit is in the condition which existed when the switch W was first thrown.

It will be understood from the foregoing description of the operation that the motor will run through one-half revolution of cam shaft 41 each time the switch W is thrown and that by throwing the switch first in one direction and then in the other direction, the motor will continue to run 180 degrees each time in the same direction.

If it should be desired, the motor can be caused to run continuously by connecting the line across the motor field coil with a switch in the circuit to start and stop the motor.

Since it is desired in accordance with our improved apparatus and method to perform the coating operations in the presence of a vacuum and without breaking the vacuum during the operations, it is not possible to use in the motor 28 ordinary insulation or wiring. Certain non-gassing insulation should be used. Fiber glass wound wire may be employed or, if desired, wires which are enamel coated or wires coated with hard Bakelite which has been baked hard to eliminate foreign substances may be employed with satisfaction.

We prefer to use a brushless induction type electric motor since sparks from brushes of an ordinary electric motor would cause sputtering of the copper from the armature within the vacuum chamber which would result in deposition of the copper upon all surfaces within the apparatus including the surfaces of the article being coated thus causing contamination and spoilage. A greaseless type motor is also preferable since grease gives off objectionable gases which would tend to impair the vacuum within the chamber of the apparatus. The motor of the present apparatus is preferably run at a speed which serves to turn the prism support 17 and the supported prism 18 twelve times per hour, but it may be run slower or somewhat faster although the lack of lubrication restricts the operation of the apparatus to relatively low speeds. In apparatus such as that herein disclosed, in order to maintain a constant vacuum within the chamber during the coating operation or operations, it is important to employ an open-type motor having special insulation and one which is run at relatively slow speed.

Having described the structure and mode of operation of the prime mover and its wiring diagram, we shall now describe the coating operation or operations as performed by our improved apparatus and carried out by our improved method.

The faces or surfaces of the prism 18 may have applied thereto a coating or coatings formed from various materials which are deposited thereupon as the result of thermally evaporating a material or different materials within the chamber of the apparatus.

Merely by way of example, let us assume that one face or surface of the prism 18 is to have applied thereto a layer, film or coating of silver and that each of the other two sides or faces of the prism is to have applied thereto a layer, film, or coating of reflective copper or a low reflection coating of magnesium fluoride. A blank prism, such as the prism 18, is mounted in position upon its rotatable support 17 with one of its faces or surfaces directed flatwise toward the evaporating units 14, 15 and 16. In accordance with the present example, pieces of silver are applied to the convolutions of the filament or coil 14a and pieces of magnesium fluoride are applied to the convolutions of the filaments or coils 15a and 16a. The vacuum pumps (not shown) are now operated to evacuate the chamber of the apparatus and to create a relatively high vacuum therein. Current is supplied to the filament or coil 14a to cause the silver on the filament to melt and to be evaporated, with molecules or particles thereof being thrown onto the face of the prism 18 which is directed toward the evaporating unit 14. After a suitable silver coating has been applied to said face, the filament 14a is deenergized. The electric motor 28 of the prime mover is now put into operation by throwing the switch W to connect the points X and Y of Fig. 7, whereupon the train of gearing will be operated and through the sprocket 21 and sprocket chain 19, the prism support 17 will be turned or rotated through 120 degrees to present a second surface, face or side of the prism 18 to the evaporating units. During the turning of the prism support through 120 degrees, the cam 42 of the prime mover will turn 180 degrees and stop. Thereupon, the filament or coil 15a is energized to evaporate the magnesium fluoride thereon, whereupon molecules or particles thereof will be thrown off and onto the second face or side of the prism to coat the same. After this coating has been completed, the filament 15a is deenergized. Thereafter, the switch W is thrown in the opposite direction to connect the points X and Z, whereupon the electric motor and gear train will be operated to again turn or rotate the prism support 17 another 120 degrees to bring the third side or face of the prism into flatwise position opposite the evaporating units. As the prism support 17 is being rotated 120 degrees, the cam 43 will be turned or revolved through 180 degrees and will then stop to cut off the motor. The filament or coil 16a is now energized to evaporate the magnesium fluoride thereon and cause molecules or particles thereof to be thrown onto the third face or surface of the prism to coat the same. After a sufficient coating has been applied to said surface, the coil or filament 16a is deenergized to cause a cessation of the evaporation.

It will be understood that during the several coating operations and the intermittent turning or rotating of the prism 18, the vacuum within the evaporating chamber will remain continuous and will not be broken during the several operations.

After the completion of the coating of the prism 18, the finished prism may be removed from the apparatus and another prism applied to the support and the operations above described repeated.

If desired, and as pointed out above, several articles, such as several of the prisms 18, may be coated by deposition simultaneously. In this case, additional prisms may be applied to the sprockets 17c, it being merely necessary to provide these sprockets with prism-engaging and supporting posts, such as the posts 17b of Fig. 3, to convert the sprocket 17c into supports or carriers for workpieces or prisms.

As stated above, various other metals and other materials than silver and magnesium fluoride may be employed and evaporated by the electric filaments or coils of the evaporating units 14, 15 and 16, dependent upon the type of coated article it is desired to produce. Likewise while we have described our apparatus in connection with the application of a coating or different coatings to the surfaces of equilateral prisms, it is obvious that adjustment of the angular rotation may readily be made in the apparatus to permit coating, successively, various prisms.

Likewise, plates of glass, plastic, Cellophane, paper, metal, etc., may be treated on the two sides as may lens or other shapes in the same manner as set forth with the prisms, the upright supports used to hold the articles being suitably modified in such cases where such should be necessary.

Further in coating round surfaced or shaped articles such as vases, dolls, figures, we have found that by use of our prime mover operating continuously during thermal evaporation, that all sides of such articles are uniformly coated as the article is rotated during the deposition. Rotation of three to sixty times per hour, or faster, has been found to be satisfactory and can readily be secured by adjustment of our gears, sprockets, or cams.

It is obvious that films of graded thickness around the periphery of such articles may also be secured where the article is rotated continuously during deposition by the suitable interposition of cams between the prime mover and the sprocket drive so that the turning movement is at non-uniform rotational speed as the article is turned through various angular amounts.

Having thus described our invention, what we claim is:

1. An apparatus for applying coatings to a plurality of surfaces of articles, comprising a base, a housing mounted on the base and providing with said base a chamber for the apparatus, rotatable supports for said articles for supporting the articles in upright positions, each of said rotatable supports having a sprocket adjacent its base, said supports being arranged around the inner periphery of the housing, means located within the housing for thermally evaporating materials to provide coatings by deposition, means for evacuating the chamber to create a high vacuum therein, an electric motor located within said chamber, and a sprocket chain operatively connecting the sprockets of said rotatable supports with said electric motor whereby to permit the rotation of the articles within the chamber without breaking the vacuum in said chamber.

2. An apparatus for applying coatings to a plurality of surfaces of articles, comprising a base, a housing mounted on the base and providing with said base a chamber for the apparatus, rotatable supports for said articles for supporting the articles in upright positions, each of said rotatable supports having a sprocket adjacent its base, said supports being arranged around the inner periphery of the housing, means located within the housing for thermally evaporating materials to provide coatings by deposition upon different surfaces of said articles, means for evacuating the chamber to create a high vacuum therein, an electric motor located within said chamber, a sprocket chain operatively connecting the sprockets of said rotatable supports with said electric motor for rotating the articles within the chamber without breaking the vacuum in said chamber, and means electrically connected to said electric motor for intermittently operating the same to turn said articles predetermined angular distances.

3. Structure according to claim 2, wherein the last-named means turns the articles predetermined angular distances of approximately 120°.

4. An apparatus according to claim 1 wherein each of said rotatable supports includes spaced upright means for engaging two of the upright edges of each of said articles.

WILLIAM H. COLBERT.
ARTHUR R. WEINRICH.